United States Patent [19]
Albion

[11] Patent Number: 5,765,783
[45] Date of Patent: Jun. 16, 1998

[54] VERTICALLY LAUNCHABLE AND RECOVERABLE WINGED AIRCRAFT

[75] Inventor: Nicholas Albion, Brookhaven, Pa.

[73] Assignee: The Boeing Company, Seattle, Wash.

[21] Appl. No.: 613,754

[22] Filed: Feb. 26, 1996

Related U.S. Application Data

[63] Continuation of Ser. No. 206,558, Mar. 4, 1994, abandoned.
[51] Int. Cl.[6] .......................... B64C 27/22; B64C 27/28; B64C 27/52
[52] U.S. Cl. .................. 244/7 B; 244/7 C; 244/17.23; 244/17.25
[58] Field of Search ................ 244/6, 7 A, 7 B, 244/7 C, 7 R, 12.4, 12.5, 10, 17.23, 17.25, 23 A, 51, 69, 90 R, 90 A

[56] References Cited

U.S. PATENT DOCUMENTS

| | | |
|---|---|---|
| 1,442,110 | 1/1923 | Welsh . |
| 1,655,114 | 1/1928 | Tesla . |
| 2,412,646 | 12/1946 | Northrop et al. . |
| 2,479,125 | 8/1949 | Leonard . |
| 2,481,379 | 9/1949 | Zimmerman . |
| 2,622,826 | 12/1952 | Prince . |
| 2,712,420 | 7/1955 | Amster et al. . |
| 2,743,885 | 5/1956 | Peterson . |
| 2,837,300 | 6/1958 | Sullivan . |
| 2,853,259 | 9/1958 | Underwood, Jr. . |
| 2,859,003 | 11/1958 | Servanty . |
| 2,886,264 | 5/1959 | Seager . |
| 2,936,968 | 5/1960 | Mazzitelli . |
| 3,096,952 | 7/1963 | Roppel . |
| 3,106,369 | 10/1963 | Borst ........................... 244/7 |
| 3,107,882 | 10/1963 | Matteson et al. . |
| 3,116,040 | 12/1963 | Petrides et al. . |
| 3,120,359 | 2/1964 | Sprecher . |
| 3,166,271 | 1/1965 | Zuck ........................... 244/7 C |
| 3,179,352 | 4/1965 | Nelson ........................ 244/7 C |
| 3,201,071 | 8/1965 | Siebenthal . |
| 3,323,534 | 6/1967 | Johnson et al. . |
| 3,350,035 | 10/1967 | Schlieben ..................... 244/7 R |
| 3,393,882 | 7/1968 | Soulez-Lariviere et al. . |
| 3,419,233 | 12/1968 | Wotton . |
| 3,470,765 | 10/1969 | Campbell . |
| 3,567,157 | 3/1971 | Dancik . |
| 3,666,209 | 5/1972 | Taylor . |
| 3,933,324 | 1/1976 | Ostrowski . |
| 4,008,979 | 2/1977 | Cooper et al. ................ 244/17.23 |
| 4,090,567 | 5/1978 | Tomlinson . |
| 4,294,279 | 10/1981 | Wyeth . |
| 4,415,133 | 11/1983 | Phillips . |
| 4,538,779 | 9/1985 | Goldstein . |
| 4,598,887 | 7/1986 | Jordan . |
| 5,054,716 | 10/1991 | Wilson . |
| 5,067,668 | 11/1991 | Zuck ............................ 244/7 R |
| 5,141,176 | 8/1992 | Kress et al. . |
| 5,289,994 | 3/1994 | Del Campo Aguilera . |

OTHER PUBLICATIONS

Aviation Week & Space Technology, "Cypher Moves Toward Autonomous Flight", Stanley W. Kandebo, Mar. 7, 1994.
Photo of Bell Helicopter Texton Inc. "Eagle Eye" Tiltrotor Aircraft.
The World's Worst Aircraft, "The Lockheed XFV-1 and the Convair XFY-1 Pogo", James Gilbert, New York, St. Martin's Press, 1976.

Primary Examiner—Andres Kashnikow
Assistant Examiner—Virnalissi Mojica
Attorney, Agent, or Firm—Mary Y. Redman

[57] ABSTRACT

A vertically launchable and recoverable winged aircraft includes an airframe, a least one proprotor connected to the airframe through a rotatable drive shaft, and collective and cyclic pitch control systems. The airframe includes a wing having a leading edge and a trailing edge which define a forward direction of flight in an airplane mode. The proprotors each have an axis of rotation generally parallel to the forward direction of flight in airplane mode, and include at least two proprotor blades. The cyclic pitch control system is operably connected to each blade to control the pitch of each blade, so that the aircraft is capable of controlled helicopter mode flight when the wing leading edge is pointed in a generally upward direction.

22 Claims, 7 Drawing Sheets

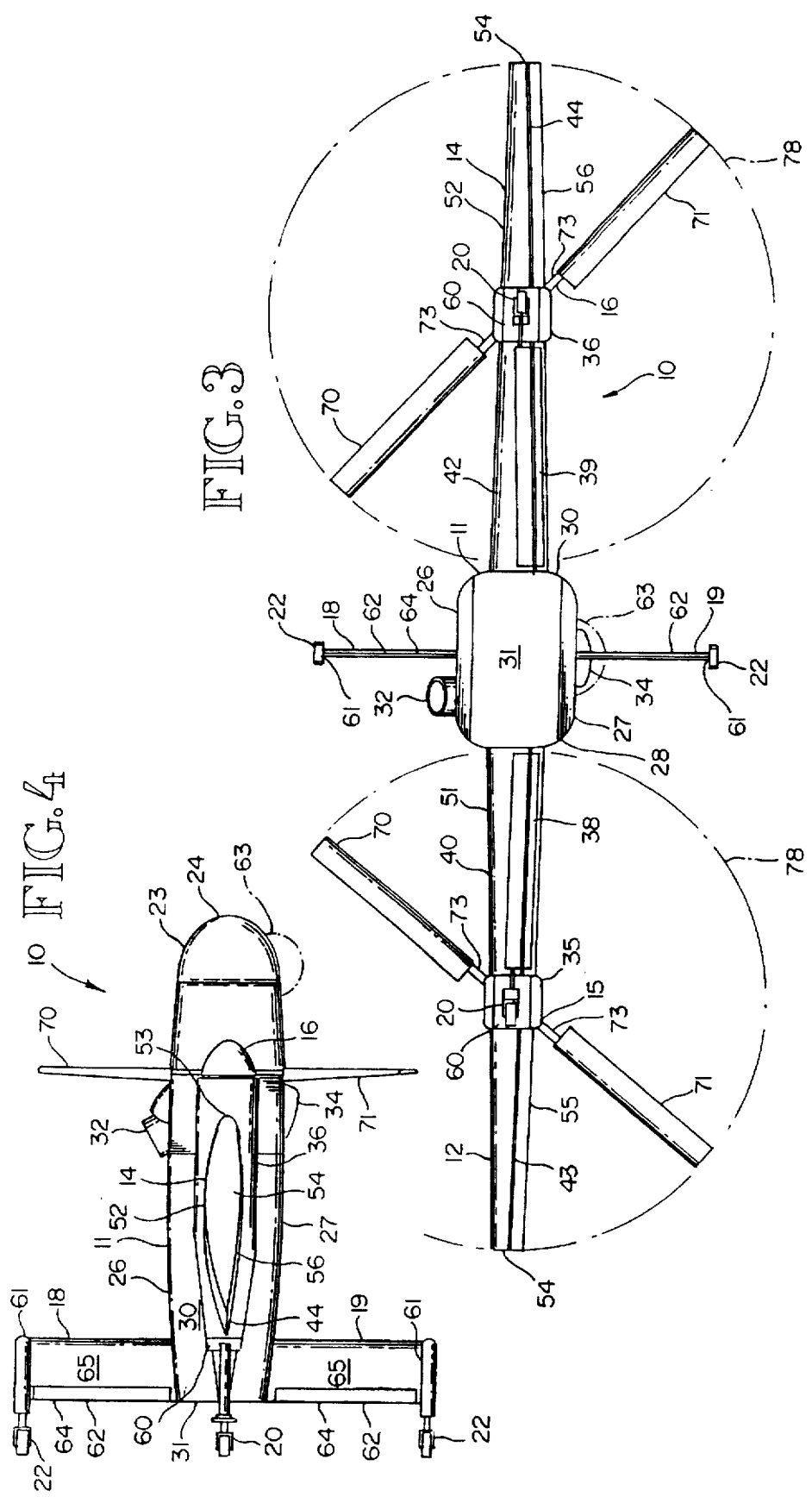

FIG. 7

| CONTROL FUNCTION | AIRCRAFT CONTROL ||
| --- | --- | --- |
| | HELICOPTER MODE | AIRPLANE MODE |
| THRUST | COMMON MODE COLLECTIVE MODE | COMMON MODE COLLECTIVE MODE |
| ROLL | CYCLIC PITCH CONTROL | DIFFERENTIAL ELEVON CONTROL |
| PITCH | DIFFERENTIAL COLLECTIVE PITCH CONTROL | COMMON ELEVON CONTROL |
| YAW | DIFFERENTIAL CYCLIC PITCH CONTROL | DIFFERENTIAL COLLECTIVE PITCH CONTROL |

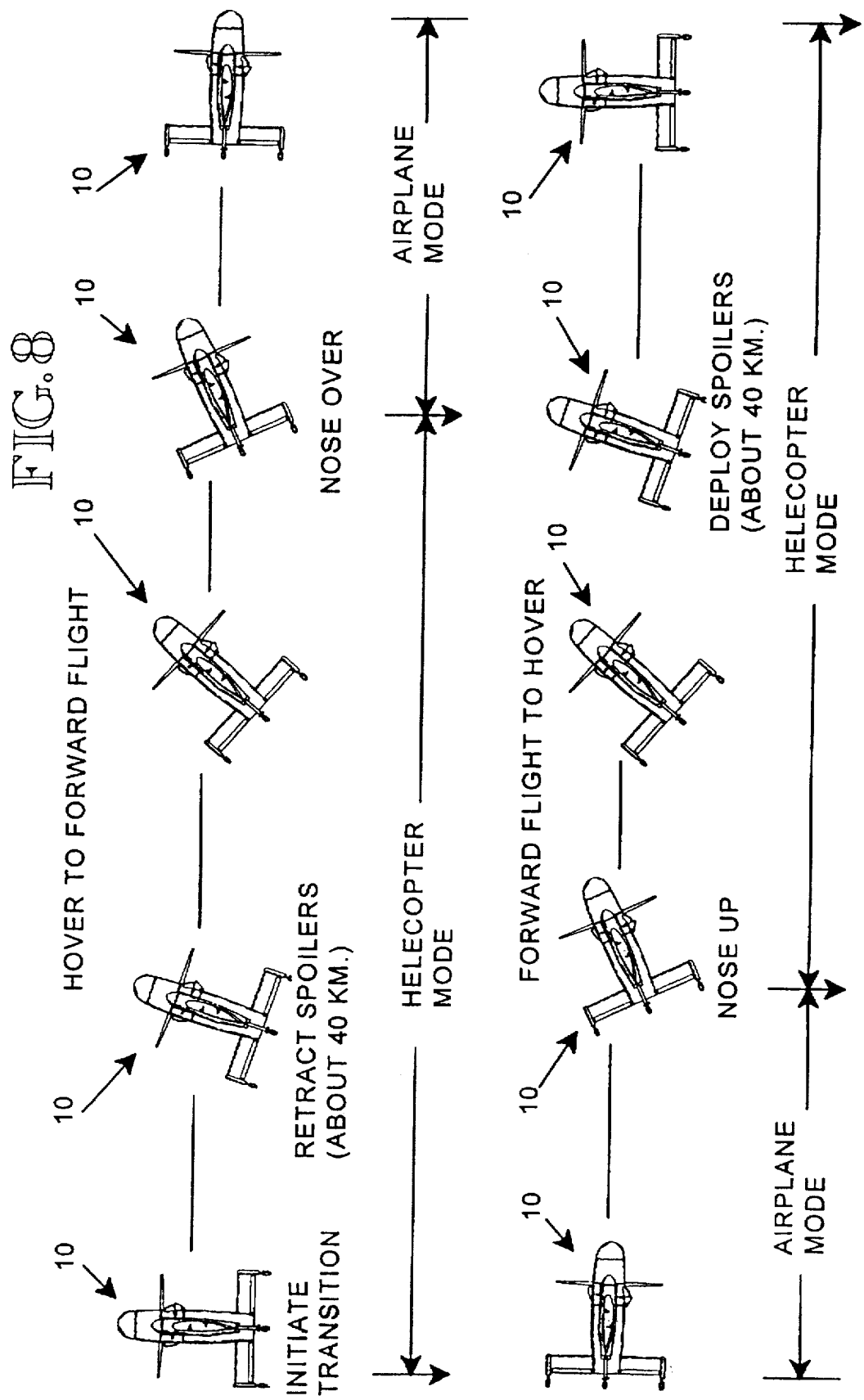

VERTICALLY LAUNCHABLE AND RECOVERABLE WINGED AIRCRAFT

This application is a continuation of prior application number 08/206,558 filed Mar. 4, 1994 now abandoned.

BACKROUND OF THE INVENTION

1. Field of Invention

This invention pertains generally to unmanned aerial vehicles (UAV), and more particularly to UAV's which have wings, yet are vertically launchable and recoverable.

2. Description of the Related Art

Various types of aerial vehicles have been developed which are capable of vertical takeoff and landing, yet which also fly like an airplane. One example is the Bell Eagle Eye, which is a tiltrotor UAV. On takeoff, the fuselage is horizontal, while the rotors are vertically oriented like a helicopter. The UAV has a collective and cyclic control system in each rotor, which allows the UAV to not only take off and land like a helicopter, but also to maneuver sideways in flight like a helicopter. For flight in the airplane mode, the UAV nacelles and rotors are rotated 90° forward on the wings so that they face frontwardly and the nacelles are horizontal like the fuselage. To allow for this rotation, the UAV has to have conversion actuator mechanisms for rotating the nacelles, and mechanisms which allow the rotors to operate throughout the entire 90° variation in orientation. These mechanisms add to the aircraft's weight and complexity, thereby increasing thrust, power and maintenance requirements, and aircraft risk.

Another aircraft example is the Bell-Boeing V-22 Osprey, which like the Bell Eagle Eye, is a tiltrotor aircraft as shown in U.S. Pat. No. 5,054,716 to Wilson. However, it is a manned aircraft. Yet another tiltrotor aircraft is disclosed in U.S. Pat. No. 3,393,882 to Soulez-Lariviere et al. U.S. Pat. No. 3,201,071 to Siebenthal discloses a tilting engine aircraft with airplane propellers.

Another similar vertical takeoff and landing (VTOL) aircraft is the tiltwing aircraft. To fly in the helicopter mode, the tiltwing aircraft's wing is tilted upward along with the rotors. Tiltwing aircraft are disclosed in U.S. Pat. Nos. 5,141,176 to Kress et al., 3,666,209 to Taylor, 3,567,157 to Dancik, 3,107,882 to Matteson et al., and 2,936,968 to Mazzitelli et al.

Manned VTOL tailsitters have been developed which were designed for taking off and landing on their tail. Examples include the Convair XFY-1, and the Lockheed XFV-1. The two propellers at the front of the fuselage on these two aircraft were coaxial and counter-rotating to cancel the spin moment during takeoff and landing. The tailsitters were controlled during takeoff, flight, and landing entirely by control surfaces on the wings and tail, such as ailerons, elevators, and rudders. During vertical flight, these control surfaces were limited in their capacity to deflect the thrust sidewardly for controlled sideward aircraft maneuverability. Other tailsitters are disclosed in U.S. Pat. Nos. 2,837,300 to Welsh, 2,481,379 to Zimmernan, 1,655,114 to Tesla, and 1,442,110 to Welsh.

It is desirable to have an unmanned VTOL aircraft, capable of both normal airplane and helicopter flight, which is simple in design, mechanically reliable, relatively light, and efficiently maneuverable in both airplane and helicopter mode flight. It is further desirable to eliminate complicated mechanisms in the aircraft such as those necessary for wing or rotor tilt, which increase aircraft weight, power and maintenance requirements, and risk.

SUMMARY OF THE INVENTION

The present invention solves the aforementioned problems and other problems of the prior art, and provides an unmanned VTOL aircraft which flies like both an airplane and a helicopter yet does not have the complicated mechanisms necessary for tilting the wing or rotor. The aircraft includes an airframe, at least one proprotor connected to the airframe through a rotatable shaft, and a cyclic pitch control system. The aircraft airframe preferably includes a center body having a front end and a central axis, and at least one wing connected to the center body in fixed relation thereto. The center body and wings together define the forward direction of aircraft flight in airplane mode. Alternatively, the airframe might not include a center body, instead being a flying wing. In such a case the wing would include a leading edge and a trailing edge which would define the forward direction of aircraft flight in airplane mode.

The proprotors each have an axis of rotation substantially parallel to the airplane mode forward direction of flight, which is generally in the direction of the center body central axis, if there is a center body. Each proprotor includes at least two proprotor blades.

The cyclic pitch control system is operably connected to each proprotor blade to control the pitch of each blade. The aircraft thereby is capable of a helicopter mode of flight with fine directional control when the center body or wing leading edge is pointing in a generally upward direction.

Each wing preferably includes a nacelle having a rear. The aircraft includes main landing gear connected to the nacelle rear or wing, which extend rearwardly substantially parallel to the wing plane, and parallel to the center body.

Preferably the aircraft center body includes two sides, and the aircraft includes two wings, each wing extending sidewardly and forwardly from one center body side. The preferred wing, therefore, is the swept forward type. In the airplane mode of flight, the wings provide a wing lifting force which is substantially centered on the aircraft center of gravity. When the aircraft flies in the helicopter mode, the rotating proprotor blades provide a proprotor lifting force substantially centered on the aircraft center of gravity.

The aircraft carries out transition from its helicopter mode of flight to its airplane mode of flight by rolling or tipping the aircraft with the cyclic pitch control system around the helicopter mode roll axis, which is substantially parallel to a transverse wing axis. Further, the aircraft flight speed is accelerated toward the rollward direction toward which the center body front end or wing leading edge was initially rolled or tipped. The acceleration continues until airflow over the wings provides a wing lifting force to the wings sufficient to lift the weight of the aircraft.

The aircraft carries out transition from its airplane mode of flight to its helicopter mode of flight by decelerating the aircraft while in airplane mode flight, pitching or tipping the center body front end or wing leading edge upwardly with the cyclic pitch control system around the pitch axis which is substantially parallel to the transverse axis of the wings, and increasing the power to the proprotors until the proprotors provide lifting force sufficient to lift the weight of the aircraft. While the aircraft is yet in airplane mode, it is preferable that the aircraft be decelerated to just slightly above the wing stall speed. For the preferred aircraft, this is at about 75 knots.

The aircraft carries out horizontal direction helicopter mode flight by tipping the proprotor disc toward the direction of intended helicopter mode flight with the cyclic pitch control system. The proprotor horizontal thrust component then drives the aircraft in the direction of intended flight. Alternatively, differential collective pitch control could be used to pitch the center body front end toward a desired direction of flight which is generally parallel to the wing or wings. By tilting the airframe, the proprotors also are tilted, creating a horizontal thrust component.

Further objects, features, and advantages of the invention will be apparent from the following detailed description when taken in conjunction with the accompanying drawings.

BRIEF DESCRIPTION OF THE DRAWINGS

FIG. 3 is a rear elevation view of the preferred vertically launchable and recoverable winged aircraft of the present invention.

FIG. 4 is a right elevation view of the preferred vertically launchable and recoverable winged aircraft of the present invention.

FIG. 7 is a diagram showing how the thrust, roll, pitch, and yaw control functions for the vertically launchable and recoverable winged aircraft of the present invention are carried out in helicopter mode and airplane mode flight.

FIG. 8 is a diagram showing how the vertically launchable and recoverable winged aircraft of the present invention carries out its transition from helicopter mode flight to airplane mode flight, and from airplane mode flight to helicopter mode flight.

DESCRIPTION OF THE PREFERRED EMBODIMENT

Figure 1:
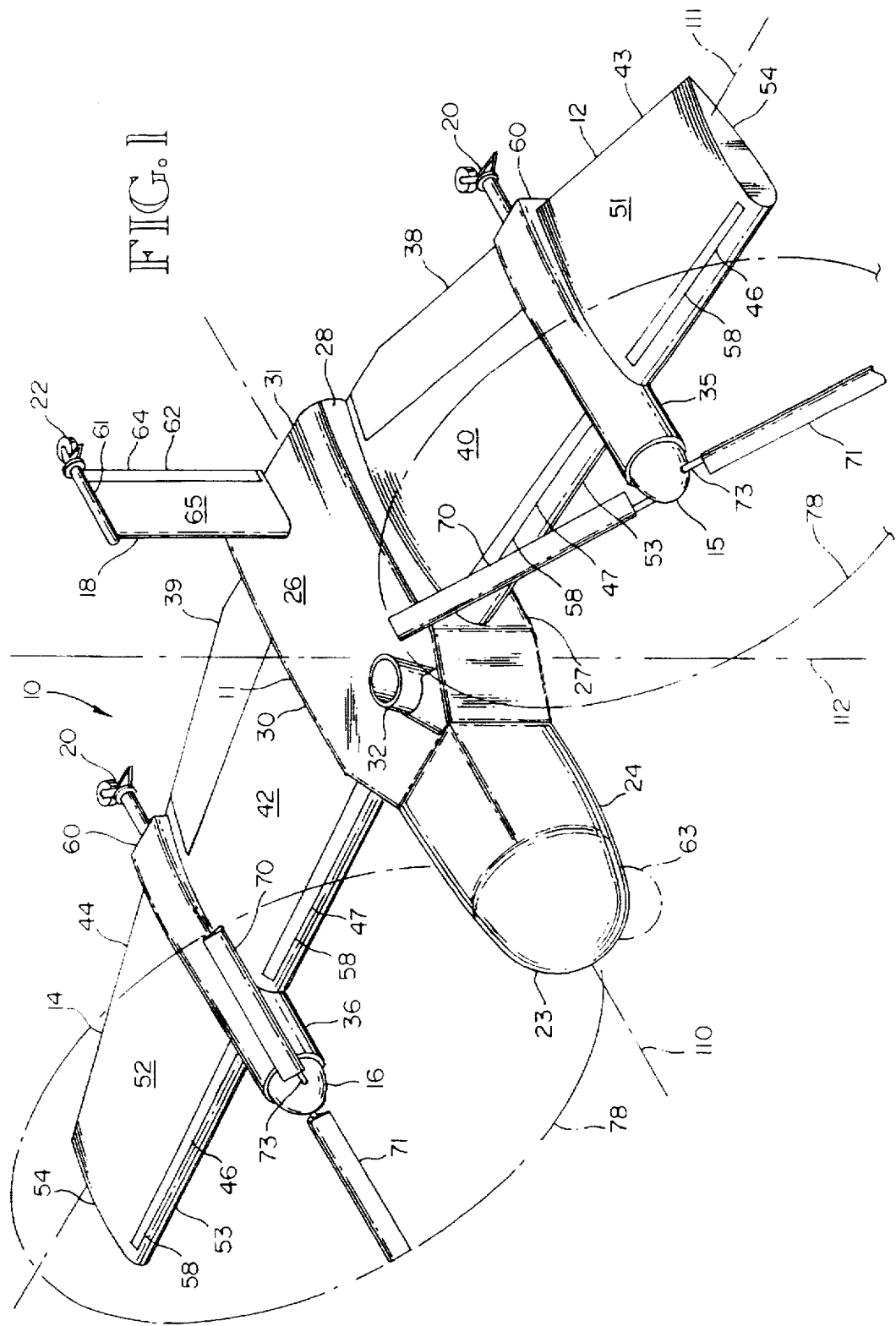
FIG. 1 is a perspective view of the preferred vertically launchable and recoverable wingedair craft of the present invention.

Referring more particularly to the drawings, wherein like numbers refer to like parts, FIGS. 1–4 show the preferred embodiment of the vertically launchable and recoverable winged aircraft 10. The aircraft 10 preferably includes a center body 11, a left wing 12, a right wing 14, a left proprotor 15, a right proprotor 16, an upper directional stabilizer or fin 18, a lower directional stabilizer or fin 19, main landing gear 20, and outrigger landing gear 22. The center body 11 and wings 12 and 14 together comprise the preferred aircraft 10 "airframe" and define the forward direction of flight for the aircraft 10 in the airplane flight mode. Alternatively, the airframe might not include a center body, instead being a flying wing. In such a case, the wing's leading edge would define the forward direction of flight for the aircraft in airplane mode.

In the preferred aircraft 10 the center body 11 includes a nose 23 at its front end 24, a top 26, a bottom 27, a left side 28, a right side 30, and a rear end 31. An exhaust pipe 32 extends upwardly from the left side of center body top 26, just rearward of the nose 23. A forward opening air intake 34 is located spanwise centrally on the center body bottom 27, just rearward of the nose 23. Forward of the wings 12 and 14, the center body sides 28 and 30 slant inboard to join the nose 23. The aircraft 10 may also include a payload 63, such as that shown in dashed lines in FIGS. 1–4.

The wings 12 and 14 extend outboard and forwardly from the center body sides 28 and 30, respectively. The wing configuration, therefore, is preferably of the swept forward type, which allows for wing attachment toward the center body rear end 31 so that the aircraft center of gravity is forward of the wing 12 or 14 quarter chord. Each wing 12 or 14 preferably includes a nacelle 35 or 36, respectively, for containing the nacelle gearboxes which are connected to the proprotors 15 and 16. Alternatively, if the wings 12 and 14 were large enough the nacelles 35 and 36 would be unnecessary. The nacelles 35 and 36 are preferably spanwise centrally located on the wings 12 and 14. The nacelles 35 and 36 extend chordwise from near the wing trailing edges 43 and 44 to forward of the leading edges 53. Extending substantially between the nacelles 35 and 36 and center body 11 on each wing 12 and 14, a rear portion of each wing includes elevator-ailerons, or "elevons" 38 and 39. The elevons 38 and 39 are pivotably connected to the main portions 40 and 42 of the wings 12 and 14, and actually form part of the wing trailing edges 43 and 44. The elevons 38 and 39 perform functions normally associated with both ailerons and elevators on airplanes. Alternatively, the elevons 38 and 39 could be full span elevons, or there could be four elevons on the wings 12 and 14.

Figure 2:
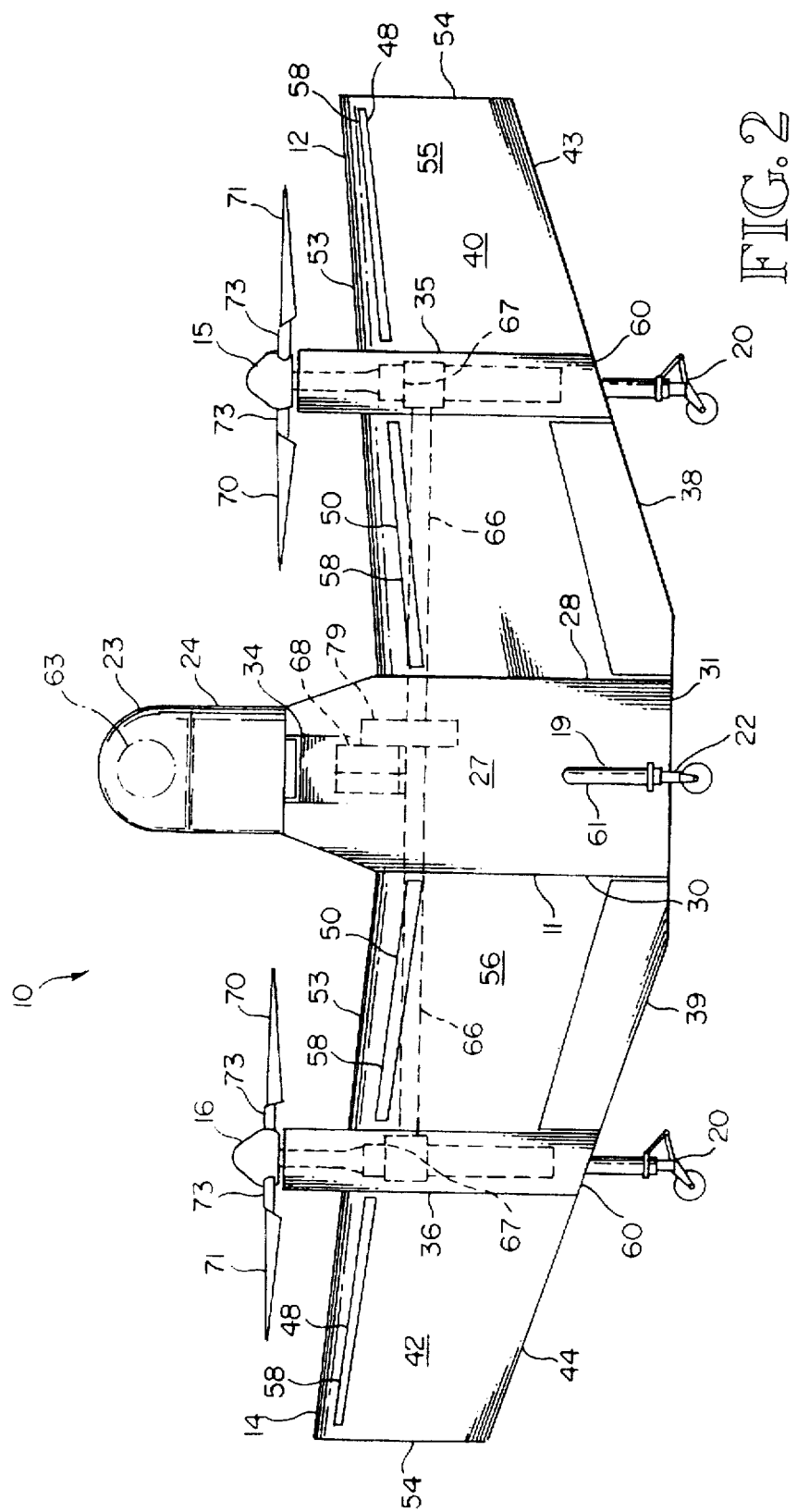
FIG. 2 is a bottom plan view of the preferred vertically launchable and recoverable winged aircraft of the present invention, showing the engine, main gearbox, drive shafts, nacelle gearboxes, and proprotor shafts schematically in dashed lines.

Furthermore, the wings 12 and 14 each include four spoilers 46, 47, 48 and 50. The wings 12 and 14 on their upper surfaces 51 and 52 include upper spoilers 46 which are spaced rearwardly from the wing leading edges 53, and extend spanwise from near the nacelles 35 and 36 to near the outboard wing ends 54. Upper spoilers 47 likewise extend spanwise from near the nacelles 35 and 36 to near the center body 11. The wings 12 and 14 on their lower surfaces 55 and 56 include similarly located lower spoilers 48 and 50, as shown in FIG. 2. All spoilers 46, 47, 48 and 50 near their front edge 58 are pivotably attached to the wing main portions 40 and 42, so that the spoilers 46, 47, 48 and 50 can pivot forward to about a 90° angle to the wing surfaces 51, 52, 55, and 56, when deployed. When retracted, they are substantially flush with the wing surfaces 51, 52, 55, and 56.

The preferred wing 12 or 14 has a rounded leading edge 53 and airfoil thickness ratio (wing thickness divided by chord length) of about 21%. The wing 12 or 14 therefore has relatively stable stall characteristics. As the angle of attack increases to the point where the wing 12 or 14 begins to stall, the stall occurs in a gradual, smooth, easily controllable manner. Alternatively, the leading edge 53 could be sharp, and the thickness ratio much lower.

The upper fin 18 extends upwardly at a 90° angle from the center body top 26, spanwise centrally located near the center body rear end 31. Similarly, the lower fin 19 extends downwardly at a 90° angle from center body bottom 27. Alternatively, the fins 18 and 19 could extend upwardly and downwardly from the center body 11 at 45° angles, both fins 18 and 19 canted to one side of the center body 11 so the fins 18 and 19 are at about a 90° angle to each other.

The main landing gear 20 preferably extend rearwardly from the rear 60 of the nacelles 35 and 36, substantially parallel to the central axes of the nacelles 35 and 36, and thus parallel to both the central chordwise-spanwise plane (the plane of the wing), and the shear plane of each respective wing 12 or 14. Alternatively, the main landing gear could extend rearwardly from the wings 12 and 14 themselves. The outrigger landing gear 22 are fastened to the outboard ends 61 of the fins 18 and 19, and are parallel to both the central chordwise-spanwise plane and the shear plane of the fins 18 and 19. If, as in the alternative embodiment, the fins 18 and 19 are canted to one side of the center body 11, then the main landing gear 20 on that side could be eliminated so that there are only three landing gear 20 and 22 instead of four. The fins 18 and 19 each include rudders 62 at the fin trailing edge 64 which extend from near the center body 11 to near the outrigger gear 22. The rudders 62 are pivotably connected to the fin main portions 65.

Preferably the engine 68 and main gearbox 79 are located in the center body 11 as shown schematically in dashed lines in FIG. 2. Two rotating shafts 66 shown in FIGS. 2 and 5 deliver power from the main gearbox 79 to the two nacelle gearboxes 67, which are mounted within the nacelles 35 and 36.

Figure 5:
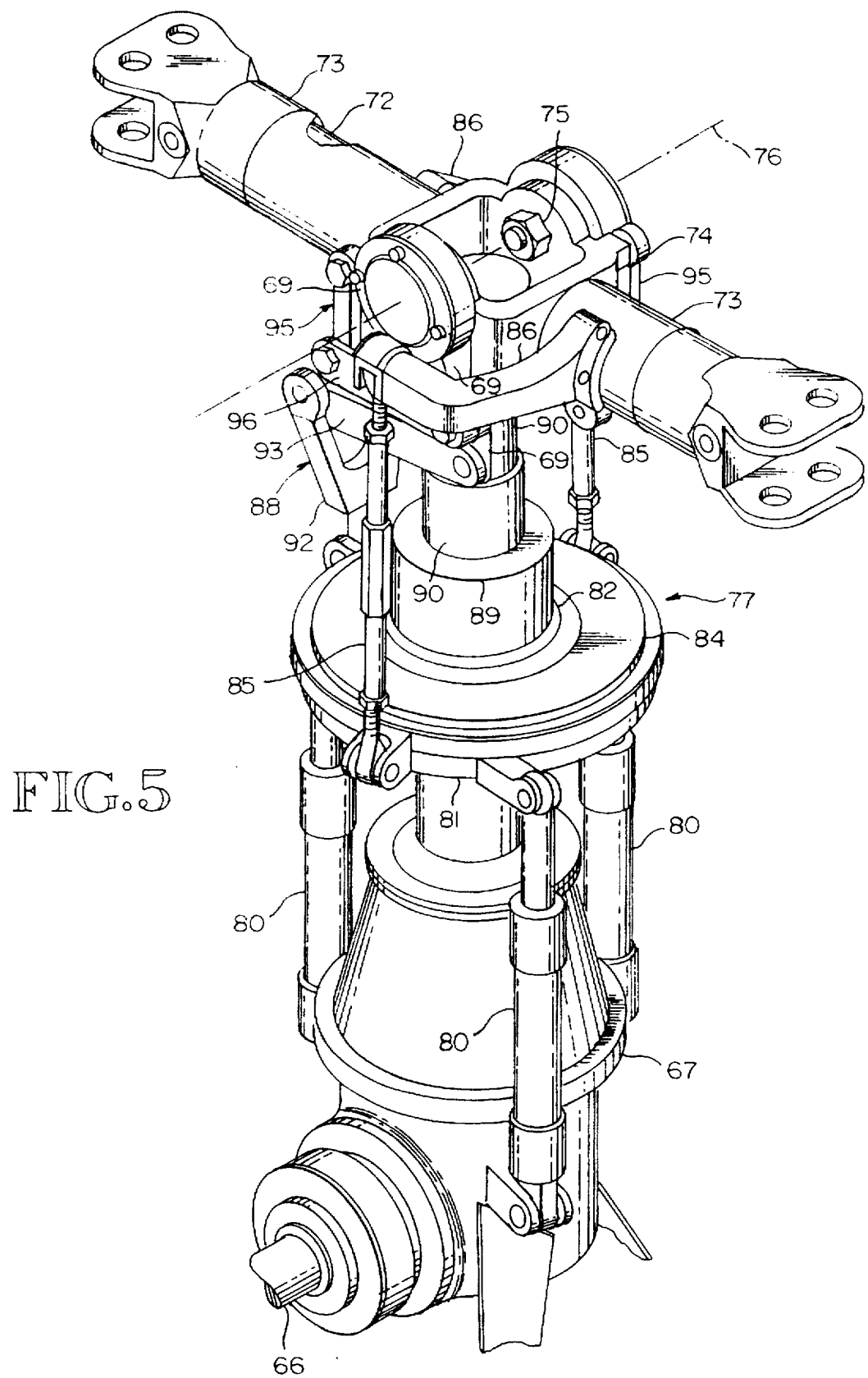
FIG. 5 is a perspective view of the preferred nacelle gearbox, proprotor, and pitch control system of the present invention, with a portion of the left side pitch housing cut away to show the hub barrel.

As shown in FIGS. 1 and 5, the proprotors 15 and 16 each include two rotor blades 70 and 71 which are each fastened to a pitch housing 73. The pitch housings 73 are pivotably connected to barrel portions 72 of the hub 74 through a bearing. The hub 74 in turn is pivotably connected to the drive yoke 69 through the teetering hinge 75 which defines the teetering axis 76 for blade flapping. The drive yoke 69 is connected by splines to the rotor shaft 90, which extends out of the nacelle gearbox 67 and delivers power to the proprotor 15 or 16.

The proprotors 15 and 16 rotate through a substantially circular planar section (actually very slightly upwardly conical) known as the disc 78, as shown in FIGS. 1 and 3. "Disc loading" is defined as the rotor thrust divided by the disc area. This aircraft 10 is designed to be a low disc loading aircraft. The low weight of this aircraft reduces the thrust necessary for flight, and the relatively long blades 70 and 71 sweep out a relatively large disc area. The length of the blades 70 and 71 is such that the disc 78 diameter is slightly less than the span of the corresponding wing 12 or 14. The disc loading is preferably between 10 pounds per square foot and 15 pounds per square foot. This range of disc loading is considered low for an aircraft which flies both as a helicopter and an airplane. If the aircraft 10 weighs 1000 pounds and has two proprotors, each with a seven foot diameter, the disc loading is about 13 pounds per square foot. If the aircraft is about 825 pounds, the disc loading is about 10.7 pounds per square foot. Tiltrotor aircraft typically have disc loads of about 26 pounds per square foot. The effect of such low disc loading is to reduce the velocity of the airstream induced by the proprotor. The low induced velocity results in relatively low helicopter mode power requirement and also in reduced sensitivity of the wing forces and moments to the proprotor induced flow. Because of the relatively low forces and moments on the wing, the cyclic pitch controls have sufficient capability to maneuver the aircraft in helicopter mode and in transition to and from airplane mode without undue reliance on controlling the proprotor induced flow over the wing (by means of elevons or other devices entrained in the induced flow).

The pitch control system 77 controls blade pitch around the pitch axes defined by the pitch housings 73 and hub barrel portions 72. With collective pitch control, the pitch of both blades 70 and 71 is changed simultaneously. When blade pitch is changed collectively, the pitch change is the same, independent of blade position within the disc 78. Since this pitch control system 77 is capable of collective pitch control, it is a "collective pitch control system."

However, it also is a "cyclic pitch control system." With cyclic pitch control, blade pitch is dependent on blade position within the disc 78. Cyclic pitch control varies blade pitch around the disc 78 so that pitch is reduced on one side of the disc 78 and increased on the other side of the disc 78. The aircraft flies toward the side on which the proprotor tilts. The proprotor tilts in the direction substantially 90° of azimuth later (determined by rotational direction) than the side of the disc 78 where the pitch is reduced. To fly in a desired direction, reduce blade pitch on the side of disc 78 where the blades advance toward the desired direction of flight, and increase blade pitch on the side of the disc 78 where the blades retreat from the desired direction of flight. Thus as used herein, the "advancing side" is the side of the disc 78 where blades advance toward the direction of flight, and the "retreating side" is the side of the disc 78 where blades retreat from the direction of flight. Therefore, if a helicopter with a counterclockwise rotating rotor is to fly in its forward direction, then blade pitch on the disc right side must be decreased, and blade pitch on the left side increased. The disc then tilts forwardly, creating a forward horizontal thrust component. Collective pitch and engine power should be increased to make up for the proportional decrease in the vertical thrust component which lifts the aircraft weight.

When the preferred aircraft 10 flies in its helicopter mode, its nose 23 or front end 24 (or wing leading edge 53 faces generally upwardly in the case of a flying wing) points generally upwardly. The preferred aircraft 10 has two proprotors 15 and 16. Since the proprotors 15 and 16 are counterrotating, as you look down on the aircraft 10 with its front end 24 pointed generally upwardly, one proprotor rotates clockwise, and the other counterclockwise. To fly in helicopter mode toward the direction which the right wing 14 points, blade pitch would vary throughout both discs 78 so that pitch is decreased on the advancing side of each disc 78, and increased on the retreating side of each disc 78. Thus with the clockwise rotating proprotor, the disc 78 side with blades advancing in the direction in which the right wing 14 points would be on the same side of the aircraft 10 as the center body bottom 27. The retreating side would be on the same disc 78 side as the center body top 26. Therefore, the blade pitch would be decreased on the bottom side of the clockwise disc 78, and increased on the top side of the clockwise disc 78. With the counterclockwise rotating proprotor, it would be the opposite. Blade pitch would be decreased on the top side of the disc 78, and increased on the bottom side of the disc 78. Thus, with each proprotor 15 or 16, each time a blade 70 or 71 goes through one rotation, it also goes through a cycle whereby its pitch is at a minimum on the advancing side of the disc 78, and at a maximum near the retreating side of the disc 78.

While the blades 70 and 71 go through these cyclical pitch changes, they also go through cyclic flapping changes which causes the proprotor tilt. About 90° after the retreating side, the blade 70 or 71 flaps upwardly, pivoting the hub 74 at the teetering hinge 75 about the teetering or flapping axis 76. About 90° after the advancing side, the blade 70 or 71 flaps downwardly. As a result, the rotor disc 78 tilts toward the desired direction of flight, creating a horizontal thrust component in the desired direction, driving the aircraft in the desired direction. Furthermore, such cyclic pitch control may be used to pitch, roll, or tip the front end 24 toward the desired direction of flight, thereby tilting the entire airframe and creating an even greater forward, rearward, or sideward component of thrust, as the case may be. The horizontal thrust component in the desired flight direction may be used to fly the aircraft 10 sidewardly, forwardly, or rearwardly in the helicopter mode, as desired.

Another way the preferred aircraft 10 can fly in the direction a wing points in helicopter mode is through use of differential collective pitch control. For example, by increasing the collective pitch of the left proprotor 15, the center body front end 24 is pitched toward the right wing 14. This pitches the whole airframe so that there is a horizontal thrust component in the direction to which the right wing 14 points. Engine power should be increased to both proprotors 15 and 16 to make up for the proportional decrease in the vertical thrust component which lifts the aircraft 10 weight. This method of flight is suitable only for flying in helicopter mode in a direction generally parallel to the wing transverse axis 111.

When the aircraft 10 is flying in airplane mode, the cyclic pitch control system could be used to develop a moment which pitches or tips the nose 23 (or wing leading edge 53 in a flying wing) upwardly or downwardly about a pitch axis parallel to the wing 12 and 14 transverse axis 111. Generally the aircraft pitching would be carried out in conjunction with raising the elevons 38 and 39 for an upward nose (or leading edge 53) pitch, and lowering the elevons 38 and 39 for a downward nose pitch.

As shown in FIG. 5, the pitch control system 77 generally includes three actuators 80, a stationary swashplate 81, a uniball 82, a rotating swashplate 84, two pitch links 85, two pitch arms 86, and a scissors 88. Alternatively, the actuators 80 could be electromechanical servos, or some other type of servo. The piston actuators 80 are spaced about 120° apart and at their lower ends are pivotably connected to lugs on the nacelle gearbox 67. At their upper ends the three actuators 80 are connected pivotably to lugs on the stationary swashplate 81. The non-rotating stationary swashplate 81 is connected to the non-rotating static mast 89 through the uniball 82. Splines between the uniball 82 and static mast 89 allow upward and downward movement of the uniball 82 and stationary swashplate 81 over the mast 89, but substantially no rotational movement about the mast 89. Two pins, about 180° apart on the stationary swashplate 81, extend inwardly into vertical slots in the uniball 82. The pin and slot structure allows the stationary swashplate 81 plane to pivot in any direction with respect to the central axis of the uniball 82 (and of the rotating rotor shaft 90), so that it is no longer at a 90° angle to the rotor shaft 90. The rotating swashplate 84 is connected rotatably to the stationary swashplate 81 through a bearing race. Two pitch links 85, spaced about 180° apart, at their lower ends are pivotably connected to lugs on the rotating swashplate 84. At their upper ends, the pitch links 85 are pivotably connected to pitch arms 86.

The scissors 88 includes a lower link 92 which at its lower end is pivotably connected to the rotating swashplate 84. At its upper end, the lower link 92 is pivotably connected to the fork 93, which is also part of what is called the scissors 88. The fork 93 is roughly Y-shaped, the two arms of the Y going around opposite sides of the rotor shaft 90 to each pivotably connect to a descending lug on the drive yoke 69.

As the rotor shaft 90 rotates, it rotates the drive yoke 69, hub 74, blades 70 and 71, pitch links 85, the scissors 88 and rotating swashplate 84. The two piece construction of the scissors 88 transmits the torque which rotates swashplate 84, independent of the pivot angle which the swashplates 84 and 81 form with respect to the central axis of the rotor shaft 90. The scissors 88 relieves the pitch links 85 from having to transmit the torque to the rotating swashplate 84. The bearing race between the rotating swashplate 84 and the stationary swashplate 81 allows the former to rotate while the latter does not.

Actuator 80 piston actuation determines the position of the swashplates 81 and 84. Collective pitch control is accomplished by moving all three actuator 80 pistons equal distances. This moves both swashplates 81 and 84 and the pitch links 85 the same distance. The pitchlinks 85, acting through the pitch arms 84, pivot both pitch housings 73 about the same amount, so the blades 70 and 71 also pivot by the same amount. Thus with collective pitch control, the pitch of all blades 70 and 71 on a proprotor 15 or 16 are simultaneously changed the same amount. The collective pitch control thereby varies the amount of thrust produced by the proprotor, and can also be used to compensate for inflow through the proprotor during flight.

Figure 6:
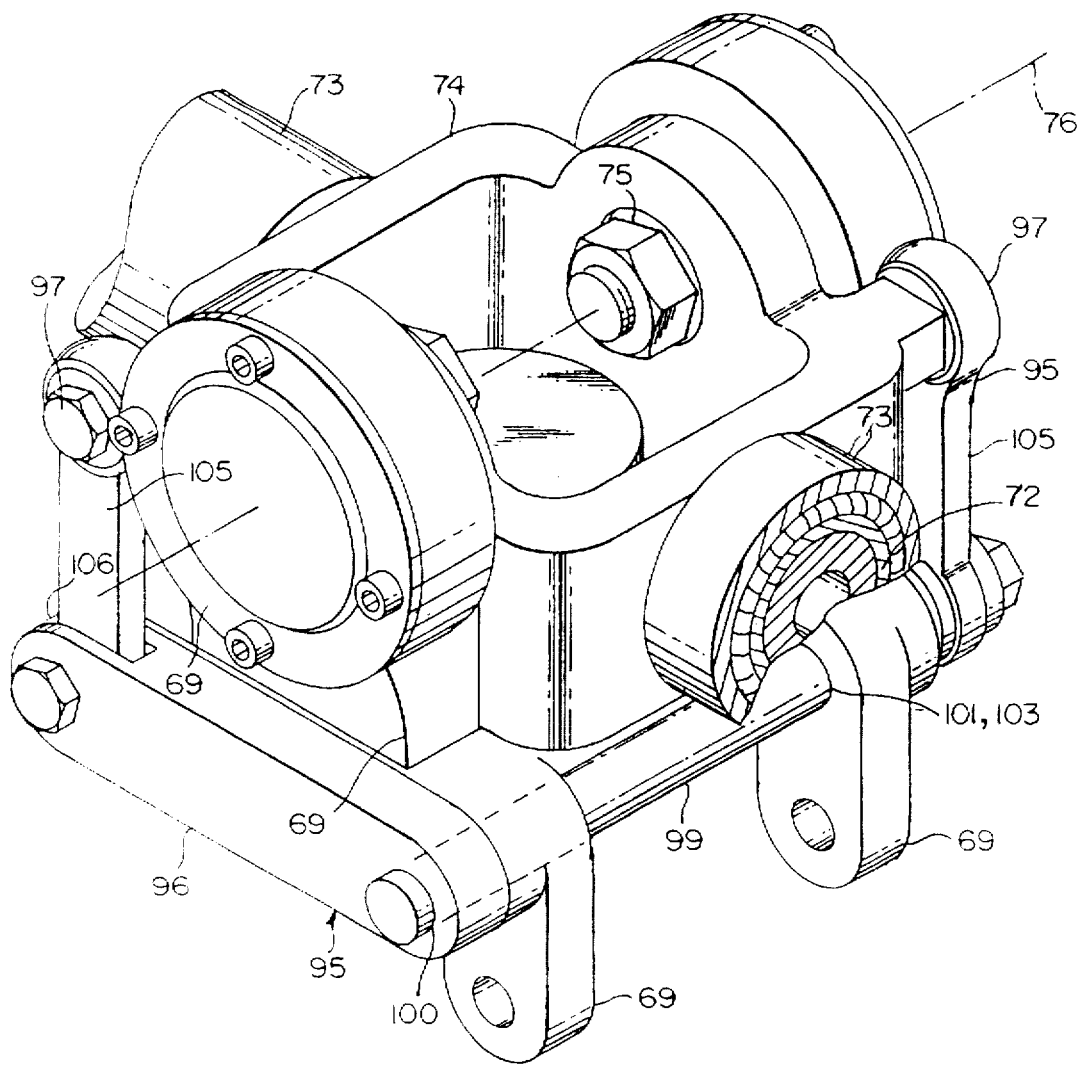
FIG. 6 is a perspective view of the preferred spring mechanism system of the present invention, and a portion of the connected drive yoke and hub.

Whenever the blades 70 and 71 flap, the hub 74, shown in FIG. 5, teeters on the teetering hinge 75 about the teetering axis 76. The flapping is diminished, and the hub 74 biased to its horizontal position through the spring system 95. As shown in FIGS. 5 and 6, the spring system 95 includes a lever arm 96 and a torsion bar 99, to which the lever arm 96 is fixedly connected at the torsion bar's proximate end at 100. The distal end 101 of the torsion bar 99 is fixedly connected to the yoke 69 at 103. The axis of the torsion bar 99 is substantially parallel to that of the teetering hinge 75. The lever arm 96 is connected to the hub 74 through force member 105. Force member 105 at upper end is pivotably connected to the hub 74 at a point 97 which is spaced radially with respect to the teetering hinge axis 76. At its lower end 106, it is pivotably connected to the lever arm 96.

Cyclic pitch control is accomplished by moving the actuator 80 pistons so that the actuator upper ends (and swashplates 81 and 84) define a plane which is not perpendicular to the central axis of the rotor shaft 90, and the two pitch links 85 thereby differ in their relative axial position. Since the pitch links 85 differ in axial position, the two pitch arms 86 also differ in position, so that the two pitch housings 73 and blades 70 and 71 are pivoted different amounts. Since the rotating swashplate 84 is rotating and both swashplates 81 and 84 are tilted, the pitch links 85 together with the pitch arms 86, pitch housings 74, and blades 70 and 71 go through an entire cycle varying blade pitch for each rotation of the rotating swashplate 84 and proprotor. The swashplates 81 and 84 are tilted downwardly in the direction of blade advance, and upwardly in the direction of blade retreat.

Cyclic pitch control can be used to change the angle of blade attack on two sides of the proprotor 15 or 16 to make up for the asymmetry of air velocity to keep the proprotor trimmed in forward helicopter mode flight. Further, it can be used to initiate a maneuver using proprotor flapping about the teetering hinge 75 by unbalancing lift on opposite sides of the proprotor. Additionally, cyclic pitch control can be used during helicopter mode flight, during transitions between helicopter mode flight and airplane mode flight, and during airplane mode flight, to control the hub force loads and moments developed by blade flapping.

As mentioned earlier, blade 70 or 71 flapping causes the hub 74 to teeter. If, for example, the left side of the hub 74 shown in FIG. 5 teeters with respect to the yoke 69 downwardly, force member 105 is pushed downwardly. As shown in FIGS. 5 and 6, this causes lever arm 96 to rotate about the torsion bar 99 axis, twisting the torsion bar 99 counterclockwise, which acts as a spring resisting the twisting motion, biasing the hub 74 back up to its normal horizontal position with respect to the yoke 69. If the left side of the hub 74 teeters up, the torsion bar 99 is twisted clockwise. The torsion bar 99 applies a counteracting force to the lever arm 96 and force member 105 to return the hub 74 to its normal position. Force member 105 provides a way of connecting the lever arm 96 to the hub 74 so that the lever arm 96 may be located a little lower for convenient connection of the lever arm 96 to the torsion bar 99, and for convenient fixed connection of the torsion bar 99 at its distal end 103 to the yoke 69. The force member 105 thereby transmits the force and motion of the hub 74 to the lever arm 96, and in turn transmits the counteracting force from the torsion bar 99 and lever arm 96 to the hub 74. Alternatively, the hub, yoke, torsion bar, and lever arm could be configured so that the lever arm is directly connected to the hub 74.

Other types of collective and cyclic pitch control systems could be used on the aircraft 10. Some of these pitch control systems are disclosed in *Helicopter Theory*, Johnson, W., Princeton University Press, 1980; *Helicopter Performance, Stability and Control*, Prouty, R. W., PWS, 1986; and *Aerodynamics of the Helicopter*, Gessow, A., and Myers, Jr., G. C., New York, Macmillan, 1952; the entire disclosures of these references which are hereby incorporated herein by reference.

The aircraft 10 preferably may include preprogramable air vehicle control computer which allows the aircraft to complete its mission autonomously or semi-autonomously, including vertical launch, transitions between airplane mode and helicopter mode waypoint navigation, and payload 63 control. Preferably, the aircraft 10 may be reprogrammed or redirected while in flight by an operator at the Ground Control Station. In another alternative, the operator could directly control the aircraft 10 from the Ground Control Station. The Ground Control Station may be of the type available from AAI Corporation in Hunt Valley, Md.

FIG. 7 shows how collective and cyclic pitch control and elevon control are used for thrust, roll, pitch, and yaw control functions in both helicopter and airplane flight modes. Before describing FIG. 7 in detail though, an explanation of the axis conventions used herein in helicopter and airplane modes must be described.

When the aircraft 10 flies in airplane mode as designated in the right column in FIG. 7, the aircraft generally carries out forward flight generally in the direction of the center body 11 central axis 110 shown in FIG. 1. Therefore, the roll axis (longitudinal axis) 110 is substantially the same as the central axis 110 of the center body, the pitch axis (lateral axis) 111 is substantially the same as the transverse wing axis 111, and the yaw axis (vertical axis) 112 is generally normal to the plane of the wings 12 and 14. In a flying wing alternative, the roll axis 110 would be in a chordwise direction, at about midspan.

On the other hand, when the aircraft 10 flies in helicopter mode as designated for the left column in FIG. 7, the aircraft 10 generally carries out forward flight in the direction of the transverse wing axis 111, like a tandem rotor helicopter such as the Navy CH-46 Sea Knight, or the Army CH-47 Chinook. Therefore, the roll axis (longitudinal axis) is substantially the same as the transverse wing axis 111, the pitch axis (lateral axis) 112 is generally normal to the plane of the wings 12 and 14, and the yaw axis (vertical axis) 110 is substantially the same as the central axis 110 of the center body 11 (or midspan in a chordwise direction in a flying wing). These are the two conventions used herein to describe aircraft 10 flight which is clearly either in the airplane mode or the helicopter mode.

However, sometimes it is unclear as to which mode the aircraft is flying in, such as when the aircraft 10 goes through a transition between modes. In those cases, the convention used herein generally will be the convention last used before mode became unclear, until either mode clearly changes or another convention is specified.

As FIG. 7 shows in the first row, proprotor thrust is provided in both the helicopter mode and airplane mode by the two proprotors 15 and 16 functioning substantially in common mode collective pitch. By changing the collective pitch of both proprotors 15 and 16 substantially in unison, the thrust from both proprotors 15 and 16 can be varied equally, thereby initiating changes in elevation and/or speed. Generally, an increase in collective pitch requires an increase in engine 68 power in order to maintain the rotational rate of the proprotors 15 and 16.

In helicopter mode (with nose 23 or wing leading edge 53 in generally upward direction in relation to earth), aircraft 10 roll is controlled preferably through use of common lateral cyclic pitch control as shown in FIG. 7. To roll the nose 23 in a bottomward direction, increase the blade pitch simultaneously in both proprotors 15 and 16 in the retreating direction and decrease blade pitch in the advancing direction. This means that with a clockwise rotating proprotor, blade pitch would be decreased on the left side of the disc 78, and increased on the right side. With a counterclockwise rotating proprotor, decrease blade pitch on the right side of the disc 78, and increase blade pitch on the left side. This cyclical change in blade pitch creates a roll moment which rolls the aircraft about its helicopter mode roll axis 111.

Aircraft 10 helicopter mode pitch is controlled through use of differential longitudinal collective pitch control. The blade pitch of each proprotor 15 or 16 is operated collectively, but the collective pitches of the two proprotors differ. Therefore, one proprotor provides more thrust than the other, creating a pitch moment which causes the aircraft to pitch about its helicopter mode pitch axis 112.

Aircraft 10 helicopter mode yaw is controlled through differential cyclic pitch control. To cause aircraft 10 yaw in a counterclockwise direction shown in FIG. 7, the blade pitch is increased on the retreating sides of the proprotors 15 and 16, and blade pitch is decreased on the advancing sides of the proprotors 15 and 16. When yawing the aircraft 10 counterclockwise in helicopter mode, if the proprotor is rotating clockwise, the advancing side of the disc 78 would be inboard, and the retreating side outboard. If the proprotor is rotating counterclockwise, then the outboard side of the disc 78 is the advancing side, and the inboard side is the retreating side. This cyclical blade pitch change creates thrust tilt that causes a yaw moment which yaws the aircraft 10 about its helicopter mode yaw axis 110.

In airplane mode (with center body 11 in the generally horizontal orientation in relation to earth), the aircraft 10 rolls through differential elevon 38 and 39 control. For example, the aircraft 10 rolls clockwise (looking forward) when the right elevon 39 is raised, and the left elevon 38 lowered. Aircraft 10 pitch is controlled by common elevon control. For example, lowering both elevons causes a downward pitch of the aircraft nose 23. Yaw is controlled through differential collective pitch control (much like pitch control in the helicopter mode above). Alternatively, the differential collective pitch control could be used in combination with the rudders 62 to control yaw in airplane mode.

Preferably, the deflection ranges of the proprotor commands and elevon commands are limited by the programmed flight control laws, or the operator, to the values given in the chart below:

Control Deflection Ranges

| Control Authority | Degrees | |
|---|---|---|
| | Min | Max |
| • Collective | 0. | +40.0 |
| • Longitudinal cyclic | −10.0 | +10.0 |
| • Lateral cyclic | −10.0 | +10.0 |
| • Differential collective | −1.5 | +1.5 |
| • Differential cyclic | −8.0 | +8.0 |
| • Elevons | −35.0 | +35.0 |

FIG. 8 demonstrates how the aircraft 10 makes the transition from helicopter mode flight to airplane mode flight and vice versa. Normally, in low-speed (e.g. 40 knots or lower) helicopter mode flight, the spoilers 46, 47, 48 and 50 are deployed so that gusts of wind do not cause wing lift because the wings remain stalled. However, in higher speed helicopter mode flight (e.g. above 40 knots), the spoilers 46, 47, 48, and 50 are retracted. In transition from helicopter mode to airplane mode, the cyclic pitch control system is used to roll or tip the aircraft 10 around its roll axis, while the thrust from both proprotors 15 and 16 is increased through collective pitch control to accelerate flight toward the direction in which the nose 23 and center body front end 24 (or wing leading edge 53) moves due to the roll. To keep the proprotors rotating at the same rate, engine 68 power should be increased. Eventually, the flight speed will reach a speed, depending on wing configuration, where the wings begin to come out of stall, and the airflow begins to attach to the wings so that air flowing over the wings 12 and 14 provides a sufficient lifting force to the wings 12 and 14 to lift the aircraft 10 weight. With stall characteristics of the preferred wings 12 and 14, the transition out of stall is relatively smooth, and takes place at about 80 knots. Therefore, use of the spoilers 46, 47, 48, and 50 to control the transition is generally unnecessary. After the transition, the elevons 38 and 39 are used to return the aircraft 10 to level flight.

However, if the wings 12 and 14 were an alternative embodiment having a sharper leading edge 53, or a lower airfoil thickness ratio, the wings would go in and out of stall more abruptly. With such alternative wings having sharp stall characteristics, it is best to leave the spoilers 46, 47, 48 and 50 deployed until the flight speed exceeds the wing stall speed by a factor of between 1.3 and 1.4. Within this speed range, the airflow will attach to the wings in a controlled manner, without risk of abruptly going into stall. As the airflow attaches, the air flows over the wings, and provides lifting force to the wings sufficient to lift the aircraft's 10 weight.

During helicopter mode to airplane mode transition, as the aircraft begins its roll, the direction toward which the center body front end 24 moves is called the "rollward" direction herein. The wing surfaces 51, 52, 55, or 56 initially facing this rollward direction are called the "rollward" surfaces. The opposite direction is called the "anti-rollward" direction herein, and the wing surfaces initially facing the anti-rollward direction are called the "anti-rollward surfaces".

To transition the aircraft 10 from airplane mode flight to helicopter mode flight, the aircraft is decelerated to slightly above the stall speed of the wings 12 and 14 while in substantially horizontal airplane mode flight. This speed for the preferred wings 12 and 14 is about 75 knots. Power to the proprotors is then increased by increasing the collective pitch and engine 68 fuel flow. At about the same time, the center body front end 24 is pitched upwardly through use of the cyclic pitch control system on each proprotor 15 and 16, and by raising both elevons 38 and 39. The cyclic pitch control system and elevons 38 and 39 together create a pitch moment which pitches the aircraft 10 about its airplane mode pitch axis. As the aircraft 10 rotates along its pitch axis, eventually the angle of attack of the wings 12 and 14 is so great that the wings begin to stall and the airflow detaches. Since the preferred wings 12 and 14 have gradual stall characteristics, the transition into stall is relatively smooth. Generally, spoiler 46, 47, 48, or 50 deployment will be unnecessary during the transition. Power to the proprotors 15 and 16 is increased, until eventually the proprotors 15 and 16 above are providing the lifting force sufficient to carry the aircraft 10 weight.

However, if the wings were an alternative embodiment with a sharper leading edge 53, or a lower airfoil thickness ratio, the wings likely would go into stall rather abruptly. They even might go violently in and out of stall repeatedly. When such alternative wings 12 and 14 with sharp stall characteristics are used on the aircraft 10, it is preferable to deploy the spoilers 46, 47, 48 and 49 to cause predictable wing stall while pitching the aircraft 10.

During airplane mode to helicopter mode transition, as the aircraft begins to pitch, the direction toward which the center body front end 24 moves is called the "pitchward" direction herein. The wing surfaces 51, 52, 55, or 56 initially facing this pitchward direction are called the "pitchward surfaces" herein. The opposite direction is called the "anti-pitchward" direction, and the wing surfaces initially facing the anti-pitchward direction are called the "anti-pitchward surfaces".

Altitude variation during either transition maneuver is less than 200 feet. The entry and exit elevations for both modes may be the same.

It is to be understood that the present invention is not limited to the particular arrangement and embodiments of parts or processes disclosed and illustrated herein, nor to the materials specified. It is intended that all matter contained in the foregoing description or shown in the accompanying drawings shall be interpreted as illustrative and not limiting. Therefore, the present invention embraces all such modified forms thereof as come within the scope of the following claims.

What is claimed is:

1. A vertically launchable and recoverable winged aircraft, comprising:
   (a) an airframe including a wing which has a leading edge which defines a forward direction of flight for said aircraft in an airplane mode;
   (b) at least one proprotor connected to said airframe through a rotatable drive shaft which has an axis of rotation substantially parallel to the airplane mode forward direction of flight, each proprotor including at least two proprotor blades which when rotating define a disc; and
   (c) a cyclic pitch control system operably connected to each blade for varying pitch of each blade with position of the blade within the disc, such that said aircraft is capable of a helicopter mode of flight in which said aircraft is maneuverable in a horizontal plane when the intro wing leading edge is pointing in a generally upward direction.

2. A vertically launchable and recoverable winged aircraft, comprising:
   (a) an airframe including
      (1) a center body having a front end; and (2) at least one wing connected to said center body in substantially fixed relation thereto, said center body and said at least one wing together defining a forward direction of flight for said aircraft in an airplane mode;

(b) at least one proprotor connected to said airframe through a rotatable drive shaft which has an axis of rotation substantially parallel to the airplane mode forward direction of flight, each proprotor including at least two proprotor blades which when rotating define a disc; and (c) a cyclic pitch control system operably connected to each blade for varying pitch of each blade with position of the blade within the disc, such that said aircraft is capable of a helicopter mode of flight in which said aircraft is maneuverable in a horizontal plane when the front end of said center body is pointing in a generally upward direction.

3. The aircraft of claim 2 wherein said aircraft has weight, and said disc defines an area, and wherein the weight divided by the disc area is in a range substantially between 10 pounds per square foot and 15 pounds per square foot.

4. The aircraft of claim 2 wherein said at least one wing includes a nacelle having a front and rear; and the aircraft further includes landing gear connected to the rear of said nacelle, extending rearwardly substantially parallel to a plane of said wing.

5. A vertically launchable and recoverable winged aircraft, comprising:

(a) an airframe including
  (1) a center body having a front end and two sides, and
  (2) two wings, each wing connected to one of the center body sides in substantially fixed relation thereto, said center body and said two wings together defining a forward direction of flight for said aircraft in an airplane mode;

(b) at least one proprotor connected to said airframe through a rotatable drive shaft which has an axis of rotation substantially parallel to the airplane mode forward direction of flight, each proprotor including at least two proprotor blades which when rotating define a disc; and (c) a cyclic pitch control system operably connected to each blade for varying pitch of each blade with position of the blade within the disc, such that said aircraft is capable of a helicopter mode of flight when the front end of said center body is pointing in a generally upward direction.

wherein said two wings extend sidewardly and forwardly from said center body such that when the aircraft is flying in airplane mode, the wings provide a wing lifting force to said aircraft substantially centered on a center of gravity of said aircraft, and such that when said aircraft is flying in helicopter mode, the rotating proprotor blades provide a proprotor lifting force to said aircraft substantially centered on the center of gravity of said aircraft.

6. A method of aircraft transition from a helicopter mode of flight to an airplane mode of flight, comprising the steps of:

(a) providing a winged aircraft initially in the helicopter mode, said aircraft including
  (1) an airframe including a wing which has a leading edge which defines a forward direction of flight for said aircraft in the airplane mode;
  (2) at least one proprotor connected to said airframe through a rotatable drive shaft which has an axis of rotation substantially parallel to the airplane mode forward direction of flight, each proprotor including at least two proprotor blades and defining a disc when rotating; and
  (3) a cyclic pitch control system operably connected to each blade for varying pitch of each blade with position of the blade within the disc;

(b) varying the pitch of each blade with the cyclic pitch control system so as to induce a roll moment causing said aircraft to roll around a roll axis substantially parallel to a transverse wing axis; and (c) accelerating flight speed toward a rollward direction toward which the wing leading edge initially rolls until airflow over said wing provides a wing lifting force to said wing sufficient to lift aircraft weight.

7. A method of aircraft transition from an airplane mode of flight to a helicopter mode of flight, comprising the steps of:

(a) providing a winged aircraft initially flying in the airplane mode, said aircraft including
  (1) an airframe including a wing which has leading edge which defines a forward direction of flight for said aircraft in the airplane mode;
  (2) at least one proprotor connected to said airframe through a rotatable drive shaft which has an axis of rotation substantially parallel to the airplane mode forward direction of flight, each proprotor including at least two proprotor blades which when rotating define a disc; and
  (3) a cyclic pitch control system operably connected to each blade for varying the pitch angle of each blade with position of the blade within the disc;

(b) decelerating the aircraft;

(c) varying the pitch angles of the blades with the cyclic pitch control system so as to pitch the wing leading edge upwardly around a pitch axis substantially parallel to a transverse wing axis, thereby stalling said wing; and (d) increasing power to said at least one proprotor until said at least one proprotor provides a lifting force sufficient to lift aircraft weight.

8. A method of helicopter mode direction aircraft flight, in which the aircraft is maneuverable in a horizontal plane, comprising the steps of:

(a) providing a winged aircraft, said aircraft including:
  (1) an airframe including a wing which has a leading edge which defines a forward direction of flight for said aircraft in an airplane flight mode, the wing leading edge facing in a generally upward direction when said aircraft is in helicopter mode flight;
  (2) at least one proprotor connected to said airframe through a rotatable drive shaft which has an axis of rotation generally parallel to the airplane mode forward direction of flight, each proprotor including at least two proprotor blades which define a proprotor disc when rotating; and
  (3) a cyclic pitch control system operably connected to each blade for varying the pitch angle of each blade with position of the blade within the disc;

(b) varying the pitch angles of the blades with said cyclic pitch control system, so as to tip said proprotor disc toward a desired horizontal direction of intended helicopter mode flight, creating a horizontal thrust component and thereby flying said aircraft in the direction of intended horizontal helicopter mode flight.

9. A method of aircraft transition from a helicopter mode of flight to an airplane mode of flight comprising the steps of:

(a) providing a winged aircraft initially in the helicopter mode, said aircraft including
  (1) an airframe including a center body having a front end; and at least one wing connected to said center body in substantially fixed relation thereto, said center body and said at least one wing defining a forward direction of flight for said aircraft in the airplane mode;
  (2) at least one proprotor connected to said airframe through a rotatable drive shaft which has an axis of rotation substantially parallel to the airplane mode forward direction of flight, each proprotor including at least two proprotor blades which define a disc when rotating; and
  (3) a cyclic pitch control system operably connected to each blade for varying the pitch angle of each blade with position of the blade within the disc;
(b) varying the pitch angles of said blades with the cyclic pitch control system so as to induce a roll movement which rolls said aircraft around a roll axis substantially parallel to a transverse wing axis; and
(c) accelerating flight speed toward a rollward direction toward which the center body front end initially rolls until airflow over said at least one wing provides a wing lifting force to said at least one wing sufficient to lift aircraft weight.

10. A method of aircraft transition from a helicopter mode of flight to an airplane mode of flight comprising the steps of:
(a) providing a winged aircraft initially in the helicopter mode, said aircraft including
  (1) an airframe including a center body having a front end; and at least one wing connected to said center body in substantially fixed relation thereto, said center body and said at least one wing defining a forward direction of flight for said aircraft in the airplane mode;
  (2) at least one proprotor connected to said airframe through a rotatable drive shaft which has an axis of rotation substantially parallel to the airplane mode forward direction of flight, each proprotor including at least two proprotor blades; and
  (3) a cyclic pitch control system operably connected to each blade for controlling pitch of each blade;
(b) rolling the aircraft with the cyclic pitch control system around a roll axis substantially parallel to a transverse wing axis; and
(c) accelerating flight speed toward a rollward direction toward which the center body front end initially rolls until airflow over said at least one wing provides a wing lifting force to said at least one wing sufficient to lift aircraft weight,
wherein said at least one wing has a wing stall speed and includes a rollward surface facing in the first direction when said aircraft is in helicopter mode, and said wing includes at least one spoiler pivotably connected to said wing on said rollward surface, and said spoiler is normally deployed while the aircraft flies in helicopter mode; and including the further step of retracting said spoiler when flight speed in the first direction reaches between 1.3 and 1.4 times the wing stall speed.

11. A method of aircraft transition from a helicopter mode of flight to an airplane mode of flight, comprising the steps of:
(a) providing a winged aircraft initially in the helicopter mode, said aircraft including
  (1) an airframe including a center body having a front end; and at least one wing connected to said center body in substantially fixed relation thereto, said center body and said at least one wing defining a forward direction of flight for said aircraft in the airplane mode;
  (2) at least one proprotor connected to said airframe through a rotatable drive shaft which has an axis of rotation substantially parallel to the airplane mode forward direction of flight, each proprotor including at least two proprotor blades; and
  (3) a cyclic pitch control system operably connected to each blade for controlling pitch of each blade;
(b) rolling the aircraft with the cyclic pitch control system around a roll axis substantially parallel to a transverse wing axis; and
(c) accelerating flight speed toward a rollward direction toward which the center body front end initially rolls until airflow over said at least one wing provides a wing lifting force to said at least one wing sufficient to lift aircraft weight,
wherein said at least one wing includes an anti-rollward surface facing in an anti-rollward direction substantially opposite said rollward direction when said aircraft is in helicopter mode, said wing includes at least one spoiler pivotably connected to said wing on said anti-rollward surface, and said spoiler is normally deployed while the aircraft flies in helicopter mode; and including the further step of retracting said spoiler before the step of rolling the aircraft.

12. A method of aircraft transition from an airplane mode of flight to a helicopter mode of flight in which the aircraft is maneuverable within a horizontal plane, comprising the steps of:
(a) providing a winged aircraft initially flying in the airplane mode, said aircraft including
  (1) an airframe including a center body having a front end; and at least one wing connected to said center body in substantially fixed relation thereto, said center body and said at least one wing defining a forward direction of flight for said aircraft in the airplane mode;
  (2) at least one proprotor connected to said airframe through a rotatable drive shaft which has an axis of rotation substantially parallel to the airplane mode forward direction of flight, each proprotor including at least two proprotor blades which define a disc when rotating; and
  (3) a cyclic pitch control system operably connected to each blade for varying pitch of each blade with position of the blade in the disc;
(b) decelerating the aircraft;
(c) varying the pitch angles of the blades with the cyclic pitch control system in a manner which results in pitching the front end of the center body upwardly around a pitch axis substantially parallel to a transverse wing axis, thereby stalling said at least one wing; and
(d) increasing power to said at least one proprotor until said at least one proprotor provides a lifting force sufficient to lift aircraft weight.

13. The method of claim 12 wherein said at least one wing includes an elevon; and including the further step of elevating the elevon to assist in pitching the center body front end upwardly.

14. A method of aircraft transition from an airplane mode of flight to a helicopter mode of flight, comprising the steps of:

(a) providing a winged aircraft initially flying in the airplane mode, said aircraft including
  (1) an airframe including a center body having a front end; and at least one wing connected to said center body in substantially fixed relation thereto, said center body and said at least one wing defining a forward direction of flight for said aircraft in the airplane mode, the at least one wing including a pitchward surface and at least one upper spoiler pivotally connected on said pitchward surface;
  (2) at least one proprotor connected to said airframe through a rotatable drive shaft which has an axis of rotation substantially parallel to the airplane mode forward direction of flight, each proprotor including at least two proprotor blades; and
  (3) a cyclic pitch control system operably connected to each blade for controlling pitch of each blade;
(b) decelerating the aircraft;
(c) pitching the front end of the center body upwardly with the cyclic pitch control system around a pitch axis substantially parallel to a transverse wing axis, thereby stalling said at least one wing; and
(d) increasing power to said at least one proprotor until said at least one proprotor provides a lifting force sufficient to lift aircraft weight; and
(e) deploying said spoiler to assist in stalling said at least one wing.

15. A method of aircraft transition from an airplane mode of flight to a helicopter mode of flight, comprising the steps of:
(a) providing a winged aircraft initially flying in the airplane mode, said aircraft including
  (1) an airframe including a center body having a front end; and at least one wing connected to said center body in substantially fixed relation thereto, said center body and said at least one wing defining a forward direction of flight for said aircraft in the airplane mode, the at least one wing including an anti-pitchward surface, and at least one lower spoiler pivotally connected on said anti-pitchward surface;
  (2) at least one proprotor connected to said airframe through a rotatable drive shaft which has an axis of rotation substantially parallel to the airplane mode forward direction of flight, each proprotor including at least two proprotor blades; and
  (3) a cyclic pitch control system operably connected to each blade for controlling pitch of each blade;
(b) decelerating the aircraft;
(c) pitching the front end of the center body upwardly with the cyclic pitch control system around a pitch axis substantially parallel to a transverse wing axis, thereby stalling said at least one wing; and
(d) increasing power to said at least one proprotor until said at least one proprotor provides a lifting force sufficient to lift aircraft weight, and
(e) deploying said spoiler to assist in stalling said at least one wing.

16. The method of claim 12 wherein the aircraft is decelerated to a slightly above stall speed of the at least one wing while yet in airplane mode flight.

17. The method of claim 16 wherein the aircraft is decelerated to about 75 knots.

18. A method of helicopter mode aircraft flight in sidewardly, forwardly, and rearwardly directions within a horizontal plane, comprising the steps of:
(a) providing a winged aircraft, said aircraft including:
  (1) an airframe including a center body having a front end and a longitudinal axis oriented generally vertically in relation to earth when said aircraft is in helicopter mode flight; and at least one wing connected to said center body in substantially fixed relation thereto, said center body and said at least one wing defining a forward direction of flight for said aircraft in an airplane flight mode;
  (2) at least one proprotor connected to said airframe through a rotatable drive shaft which has an axis of rotation generally parallel to the airplane mode forward direction of flight, each proprotor including at least two proprotor blades which define a proprotor disc when rotating; and
  (3) a cyclic pitch control system operably connected to each blade for varying the pitch angle of each blade with the blade's position in the proprotor disc;
(b) varying the pitch angles of the blades with said cyclic pitch control system, so as to tip said proprotor disc toward a sideward, forward or rearward direction of intended helicopter mode flight, creating a horizontal thrust component in that direction and thereby flying said aircraft in the direction of intended helicopter mode flight.

19. The method of claim 18 wherein the direction of intended flight is substantially parallel to a wing axis of said aircraft.

20. The method of claim 18 wherein the direction of flight is substantially normal to said at least one wing.

21. A method of helicopter mode aircraft flight in sidewardly, forwardly, and rearwardly directions within a horizontal plane, comprising the steps of:
(a) providing a winged aircraft, said aircraft including:
  (1) an airframe including a center body having a front end and a longitudinal axis oriented generally vertically in relation to earth when said aircraft is in helicopter mode flight; and at least one wing connected to said center body in substantially fixed relation thereto, said center body and said at least one wing defining a forward direction of flight for said aircraft in an airplane flight mode;
  (2) at least one proprotor connected to said airframe through a rotatable drive shaft which has an axis of rotation generally parallel to the airplane mode forward direction of flight, each proprotor including at least two proprotor blades which define a proprotor disc when rotating; and
  (3) a cyclic pitch control system operably connected to each blade for varying pitch of each blade with the blade's position in the proprotor disc;
(b) varying the pitches of the blades with said cyclic pitch control system, so as to tip said proprotor disc toward a sideward, forward or rearward direction of intended helicopter mode flight, creating a horizontal thrust component in that direction and thereby flying said aircraft in the direction of intended helicopter mode flight;
wherein said at least one wing includes at least one surface and includes at least one spoiler which is pivotably connected to said surface, wherein said spoiler is deployed when said aircraft flies at most at about 40 knots.

22. A method of helicopter mode aircraft flight in which an aircraft is maneuverable within a horizontal plane, comprising the steps of:

(a) providing a winged aircraft, said aircraft including:
  (1) an airframe including a wing which has a transverse axis, and a leading edge which defines a forward direction of flight for said aircraft in an airplane flight mode, the wing leading edge facing in a generally upward direction when said aircraft is in helicopter mode flight;
  (2) two proprotors, each connected to said airframe through a rotatable drive shaft which has an axis of rotation generally parallel to the airplane mode of flight, each proprotor including at least two blades, said proprotors being spaced from each other with respect to the wing transverse axis; and
  (3) two collective pitch control systems, each collective pitch control system operably connected to one of said proprotors for controlling collective pitch of the blades in said proprotor;
  (4) with said collective pitch control systems, varying the collective pitches of the two proprotors so that the collective pitch of one proprotor is greater than the collective pitch of the other proprotor so that the aircraft tilts about a helicopter mode pitch axis, creating a horizontal thrust component so that the aircraft may fly in a direction generally parallel to the wing transverse axis.

* * * * *